(12) United States Patent
Asman

(10) Patent No.: US 8,167,111 B2
(45) Date of Patent: May 1, 2012

(54) SORT GAP CONTROL

(75) Inventor: Troy E. Asman, Mason, OH (US)

(73) Assignee: Intelligrated Headquarters LLC, Mason, OH (US)

(*) Notice: Subject to any disclaimer, the term of this patent is extended or adjusted under 35 U.S.C. 154(b) by 0 days.

(21) Appl. No.: 13/325,569

(22) Filed: Dec. 14, 2011

(65) Prior Publication Data
US 2012/0079869 A1 Apr. 5, 2012

Related U.S. Application Data

(62) Division of application No. 11/880,647, filed on Jul. 23, 2007.

(60) Provisional application No. 60/832,418, filed on Jul. 21, 2006.

(51) Int. Cl.
*B65G 47/10* (2006.01)
*B65G 47/46* (2006.01)
*B29C 39/00* (2006.01)
*G06F 7/00* (2006.01)

(52) U.S. Cl. ......... 198/370.01; 198/370.02; 198/370.03; 198/349.95; 198/463.1; 700/193; 700/213; 700/218; 700/219; 700/222

(58) Field of Classification Search .................. None
See application file for complete search history.

(56) References Cited

U.S. PATENT DOCUMENTS

| | | | | |
|---|---|---|---|---|
| 3,361,247 A * | 1/1968 | Lauzon et al. | | 198/350 |
| 4,214,663 A * | 7/1980 | Schopp et al. | | 209/552 |
| 4,501,365 A * | 2/1985 | Peyton et al. | | 209/548 |
| 5,165,515 A * | 11/1992 | Nitschke et al. | | 198/349.95 |
| 7,284,652 B2 * | 10/2007 | Zeitler et al. | | 198/370.02 |

* cited by examiner

*Primary Examiner* — Gene Crawford
*Assistant Examiner* — Yolanda Jones
(74) *Attorney, Agent, or Firm* — Frost Brown Todd LLC

(57) ABSTRACT

A sortation conveyor includes a method of calibrating the control system to provide a calibration value indicative of the spacial correlation between the sort induct sensor and the first shoe sensor.

8 Claims, 17 Drawing Sheets

```
switch (box.FobShoeSensorState)
{
    case IO_STATE_OFF:
        LEtoShoeDistance[x] = measuredDistance[x] –
(box.FobShoeSensorTimeOnLast + box.FobShoeSensorTimeOff) * box.SorterCurrentFPM / 5000);
        break;

case IO_STATE_LE:
        LEtoShoeDistance[x] = measuredDistance[x] - 5.0;
        break;

case IO_STATE_ON:
        LEtoShoeDistance[x] = measuredDistance[x] –
(box.FobShoeSensorTimeOn * box.SorterCurrentFPM / 5000.0 );
        break;

case IO_STATE_TE:
        LEtoShoeDistance[x] = measuredDistance[x] –
(box.FobShoeSensorTimeOnLast * box.SorterCurrentFPM / 5000.0 );
        break;
}
```

FIG. 9

Tracking bitmasks:

|  | Hexadecimal | Binary |
|---|---|---|
| FOB_BIT | 0x8000 | 1000 0000 0000 0000 |
| EOB_BIT | 0x4000 | 0100 0000 0000 0000 |
| TRAILING_SHOE_BIT | 0x1000 | 0001 0000 0000 0000 |

Carton details ⎵ Carton Id (12 bits → max value = 4096)

Example: a carton that is ~20 inches long will normally take up 4 positions in the track array. If the carton has a CartonId = 2137 then the track array may appear as follows:

| 0 | 0 | 6233 | 6233 | 18521 | 2137 | 2137 | 34905 | 0 | 0 |

Decimal   Hexadecimal
34905   0x8859  (FOB_BIT)
2137    0x0859
18521  0x4859  (EOB_BIT)
6233   0x1859  (TRAILING_SHOE_BIT)

FIG. 10

Note: the elements of the following structure which are utilized
in the Small Gap Sorting algorithm are highlighted below.

```
typedef struct
{
    bool                            bValidLeadGap;
    bool                            bValidTrailGap;
    USHORT                          CartonLookupIdx;
    USHORT                          InfeedLocation;
    USHORT                          destination_assigned;
    USHORT                          destination_final;
    USHORT                          destination_intended;
    USHORT                          destination_wms;
    USHORT                          SorterNumber;
    bool                            OverlapCarton;
    DIVERT_CODE                     DivertCode;
    CARTON_LOOKUP_PROGRESS          lookup_progress;
    CARTON_LOOKUP_PROGRESS_ERROR    lookup_progress_error;
    CARTON_ERROR_STS                error_sts;
    char                            error_sts_owner;
    CARTON_PROGRESS                 progress;
    char                            progress_owner;
    INDUCT_METHOD                   induct_method;
    char                            last_known_location;
    SCANNER_STATUS                  scanner_sts;
    SCANNER_STATUS                  scale_sts;
    USHORT                          StoreNum;
    USHORT                          GapAheadInMs;
    USHORT                          LengthInMs;
    USHORT                          GapBehindInMs;
    double                          FOBtoShoeDist;
    double                          EOBtoShoeDist;
    double                          GapAheadInches;
    double                          LengthInInches;
    double                          GapBehindInches;
    int                             InductedFPM;
    USHORT                          TrailingID;
    USHORT                          LeadingID;
    MYSYSTEMTIME                    time_diverted;
    MYSYSTEMTIME                    time_inducted;
    USHORT                          num_times_inducted;
    char                            barcode1[BARCODE_1_LENGTH + 1];
    char                            barcode2[BARCODE_2_LENGTH + 1];
    char                            weight[WEIGHT_LENGTH + 1];
} INDUCTED_CARTON_INFO;
```

FIG. 11

SORT GAP CONTROL

This is a divisional of U.S. patent application Ser. No. 11/880,647 filed on Jul. 23, 2007, which claims priority from U.S. Provisional Patent Application Ser. No. 60/832,418, filed on Jul. 21, 2006, the disclosures of both of which are incorporated herein by reference.

TECHNICAL FIELD

The present invention relates generally to control for conveyors, and more particularly to control logic for sortation conveyors used to direct articles carried by the upper conveying surface of the sortation conveyor to laterally extending diverts.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 9 is an embodiment of an algorithm for modifying the calibration value determined by the calibration logic averaging the variation in the three manually measured distances.

FIG. 10 illustrates an embodiment of the data of tracking bit masks of the Tracking Array.

FIG. 11 illustrates an embodiment of the data of the Carton Data record for a carton.

Figure 1:
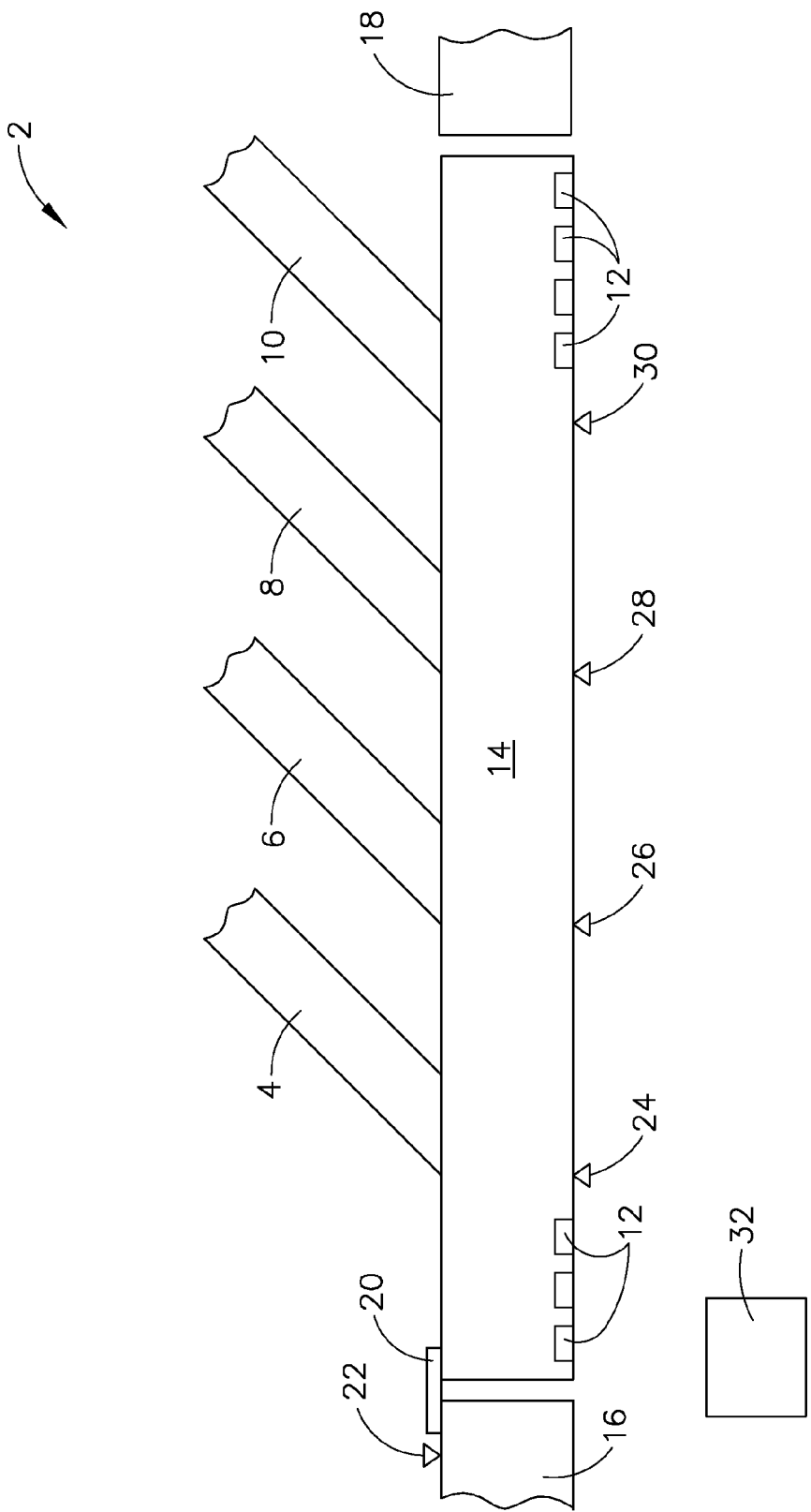
FIG. 1 is a diagrammatic view of a sortation conveyor system.

Reference will now be made in detail to the present preferred embodiment of the invention, an example of which is illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the invention will now be described.

Referring to FIG. 1, sortation conveyor, generally indicated at 2 is diagrammatically illustrated. Sortation conveyor 2 includes a plurality of laterally extending divert conveyors 4, 6, 8, 10, known by many names such as spur conveyors, after sort conveyors, diverts, etc. Although four diverts are illustrated, it will be understood that sortation conveyors may be have any number of diverts. Sortation conveyor 2 is illustrated as having a plurality of divert elements 12, also known as pushers or shoes, carried by longitudinally moving endless conveying surface 14. FIG. 1 illustrates only a few pushers 12, it being understood, as is well known, that pushers 12 are located along the entirety of sortation conveyor 2. Additionally, although diverts 4, 6, 8 and 10 are shown along only one longitudinal side of sortation conveyor 2, they may be on either or both sides, as in the case of a dual sided sorter. It will also be understood that for a dual sided sorter, pushers 12 will be disposed on the appropriate side as is necessary to divert the article with which they are aligned to the appropriate side as dictated by the location of the divert conveyor. Herein, articles refer to any object or item which is carried by the sortation conveyor for diversion, and may also be referred to as boxes or cartons. The teachings of the present invention may be used on single sided or dual sided sorters, and on sorters using different structures to direct articles to the appropriate locations.

Conveyor 16 feeds articles on to sortation conveyor 2, and conveyor 18 receives articles from sortation conveyor 2 which were not diverted. Conveyor 16 may be driven off of sortation conveyor 2, such as through power take off 20.

To detect articles, sort induct photo eye 22 is disposed adjacent the entrance to sortation conveyor 2, in the embodiment depicted on conveyor 16. For each divert 4, 6, 8, 10, there is a respective shoe sensor 24, 26, 28, 30 for detecting the presence of the shoe proximal the divert location. In the embodiment depicted, shoe sensors 24, 26, 28, 30 are photo eyes which detect the presence of the shoe bearing. Photo eye 22 and shoe sensors 24, 26, 28, 30 may be disposed in any suitable location, and be any suitable sensor type for their respective functions.

Control 32 is connected to and executes the control logic for sortation conveyor 2. Control may be any suitable device. Sortation conveyor 2 may include individual modules which locally control the divert function. As is well known, a divert mechanism (not shown), such as a switch, associated with each divert 4, 6, 8, 10 is selectively actuated to effect the diversion of the articles to the appropriate divert.

Figure 2:
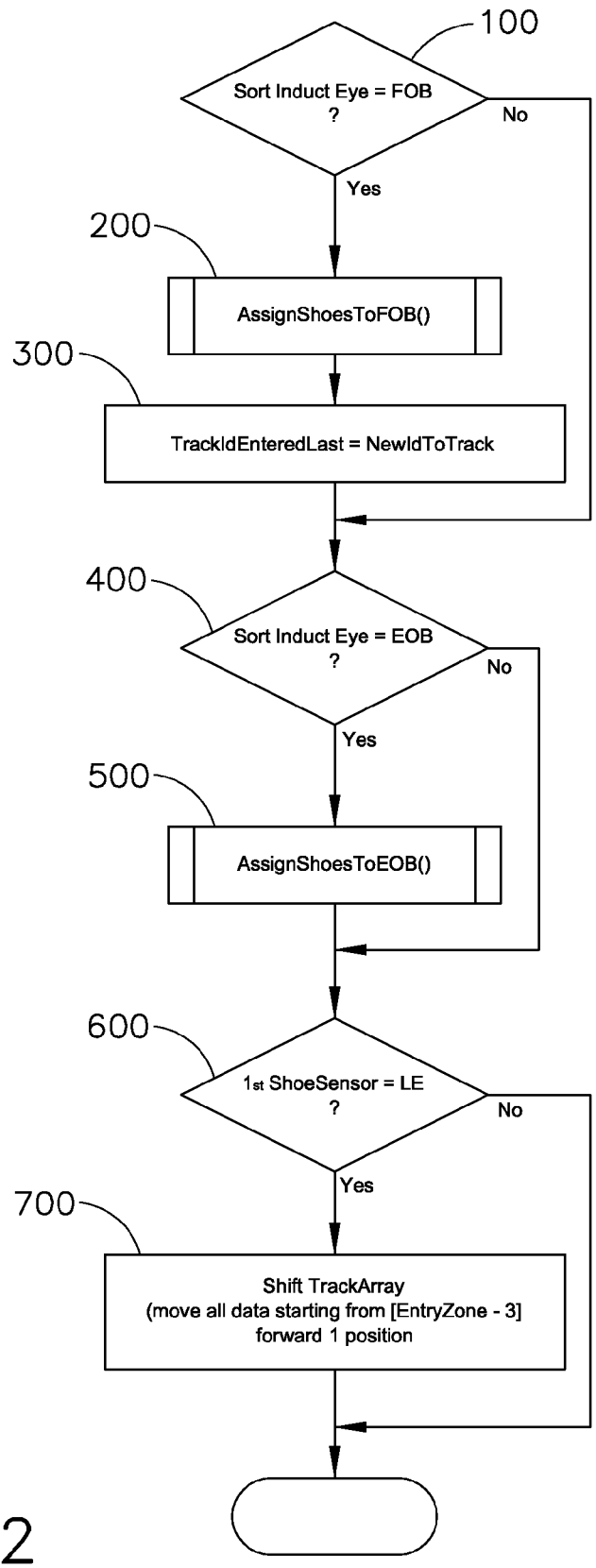
FIG. 2 is a flow diagram illustrating sorter tracking control logic used in control of a sortation conveyor system embodying teachings of the present invention.

FIG. 2 is a flow diagram illustrating sorter tracking control logic embodying teachings of the present invention. The control logic may be executed at any suitable rate, such as every 2 milliseconds. At 100, the sorter tracking logic watches for the arrival of the front of a box. In the embodiment depicted, the I/O driver looks at the state of the sort induct eye and provides on, off, leading edge, trailing edge information to the control system. If the front of a box at the sort induct eye is indicated, the sorter tracking logic calls the assign shoe to front of box control logic 200. After executing the assign shoe to front of box control logic 200, the sorter tracker control logic sets the variable TrackIdenteredLast equal to the NewIdtoTrack at 300. If the end of a box at the sort induct eye is indicated at 400, the sorter tracking logic calls the assign shoe to end of box control logic 500. After executing the assign shoe to end of box logic at 500, the sorter tracker logic determines at 600 whether the first shoe sensor indicates the leading edge of the bearing of a pusher. In the embodiment depicted, the first shoe sensor is sensor 24, and its signal is used to correlate the boxes to the shoes. It will be appreciated that the practice of teachings of the present invention is not limited to using the first shoe sensor, and any suitable sensor at any suitable location may be used. (In the embodiment depicted, the first shoe sensor is essentially a reference shoe sensor used to detect shoes as they arrive at a reference location (i.e., the first divert 4 in the embodiment depicted.) If the first shoe sensor indicates the leading edge of the bearing of a pusher, at 700 the sort tracker logic shifts the track array forward one position to match the advancement of the pushers, moving all the data forward one position. Each individual data segment in the track array contains data concerning whether the pusher corresponding to that segment is assigned to a box, whether the front of the box or the end of the box aligns with that pusher, whether the pusher is a trailing shoe. Shifting the array forward one position maintains the correlation of the data to the advancing shoe. The sort tracker logic then returns to 100 and repeats.

Figure 3A:
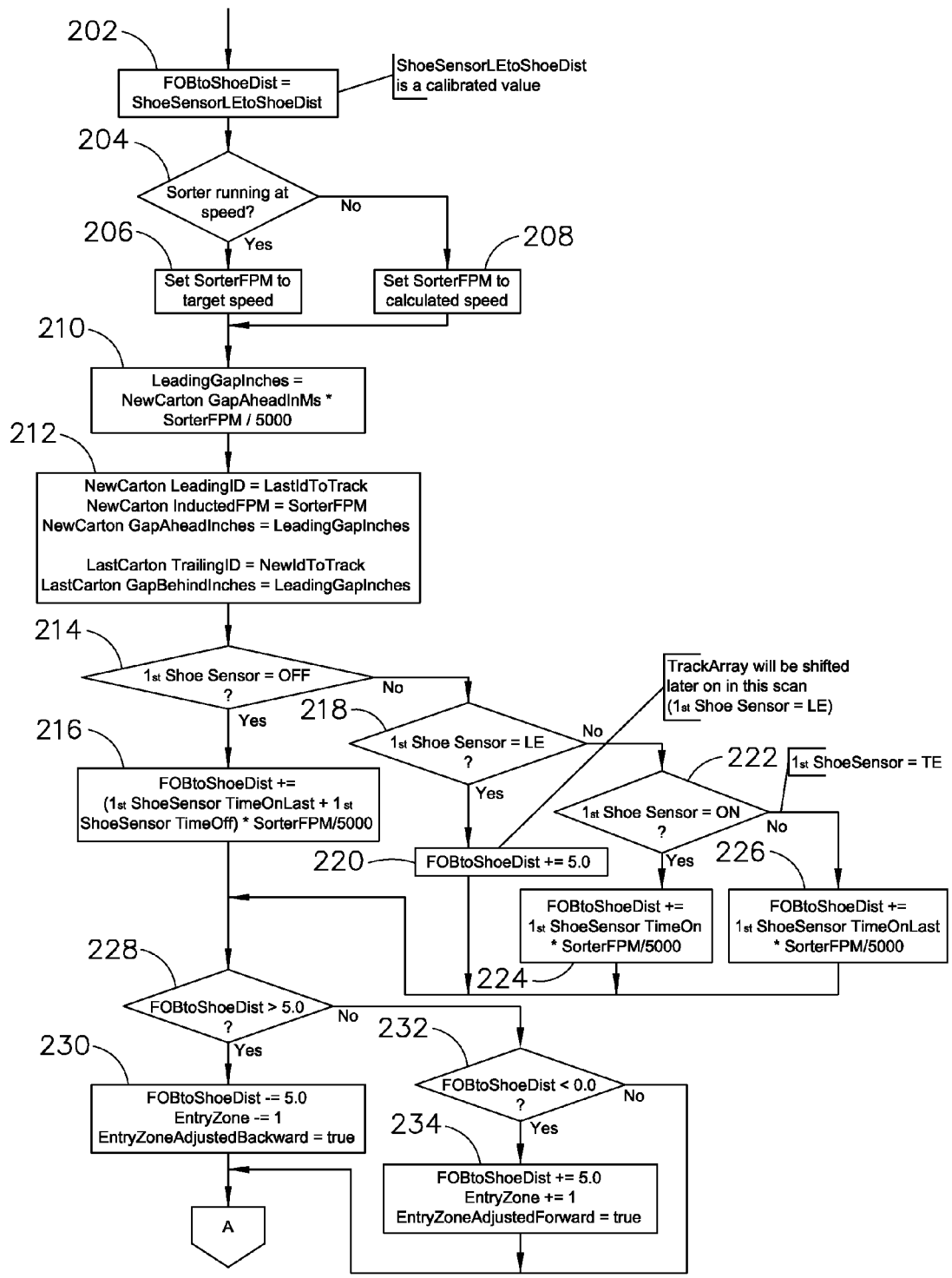
FIGS. 3A, 3B and 3C are a flow diagram illustrating assign shoe to front of box control logic used in control of a sortation conveyor system embodying teachings of the present invention.
Figure 3B:
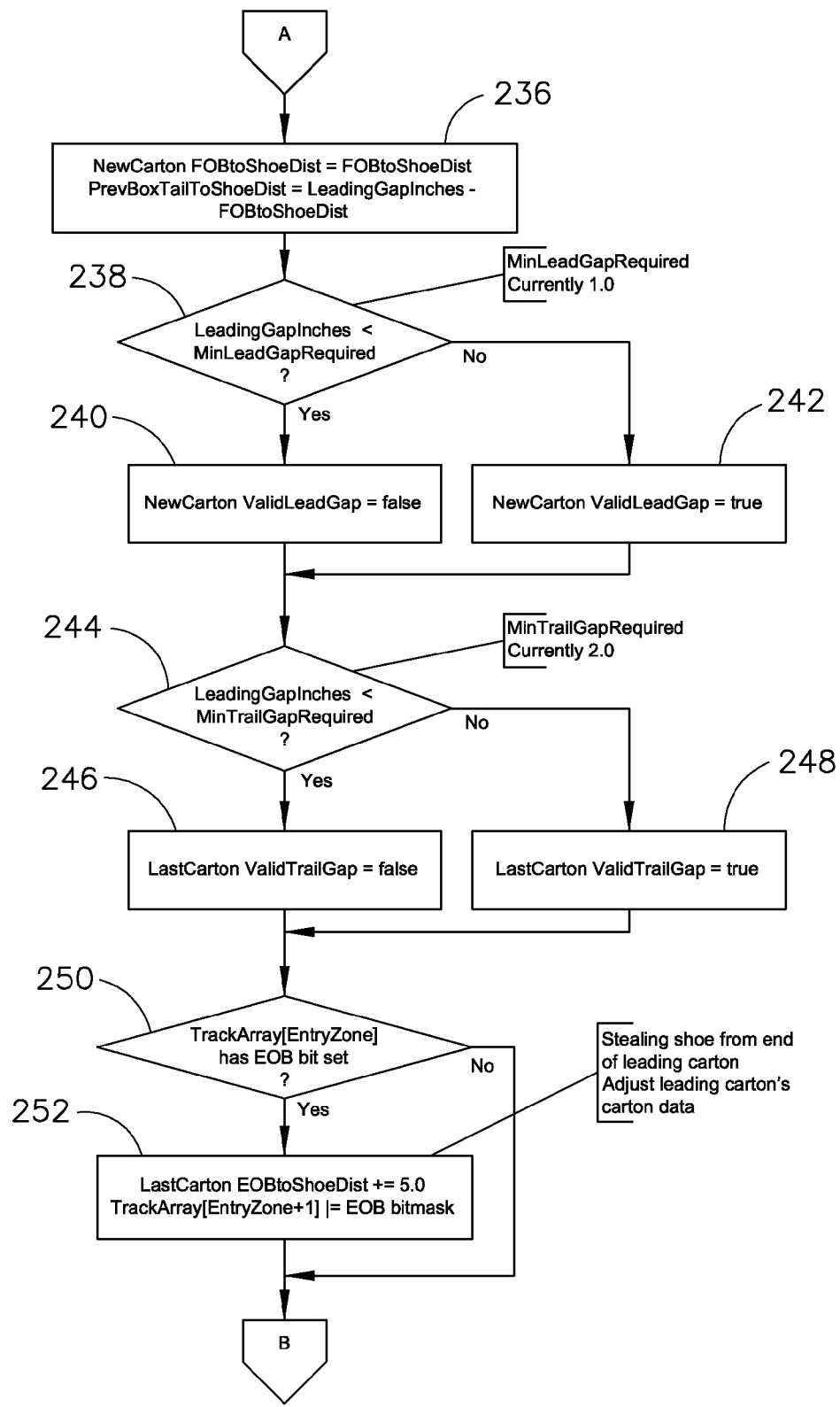
Figure 3C:
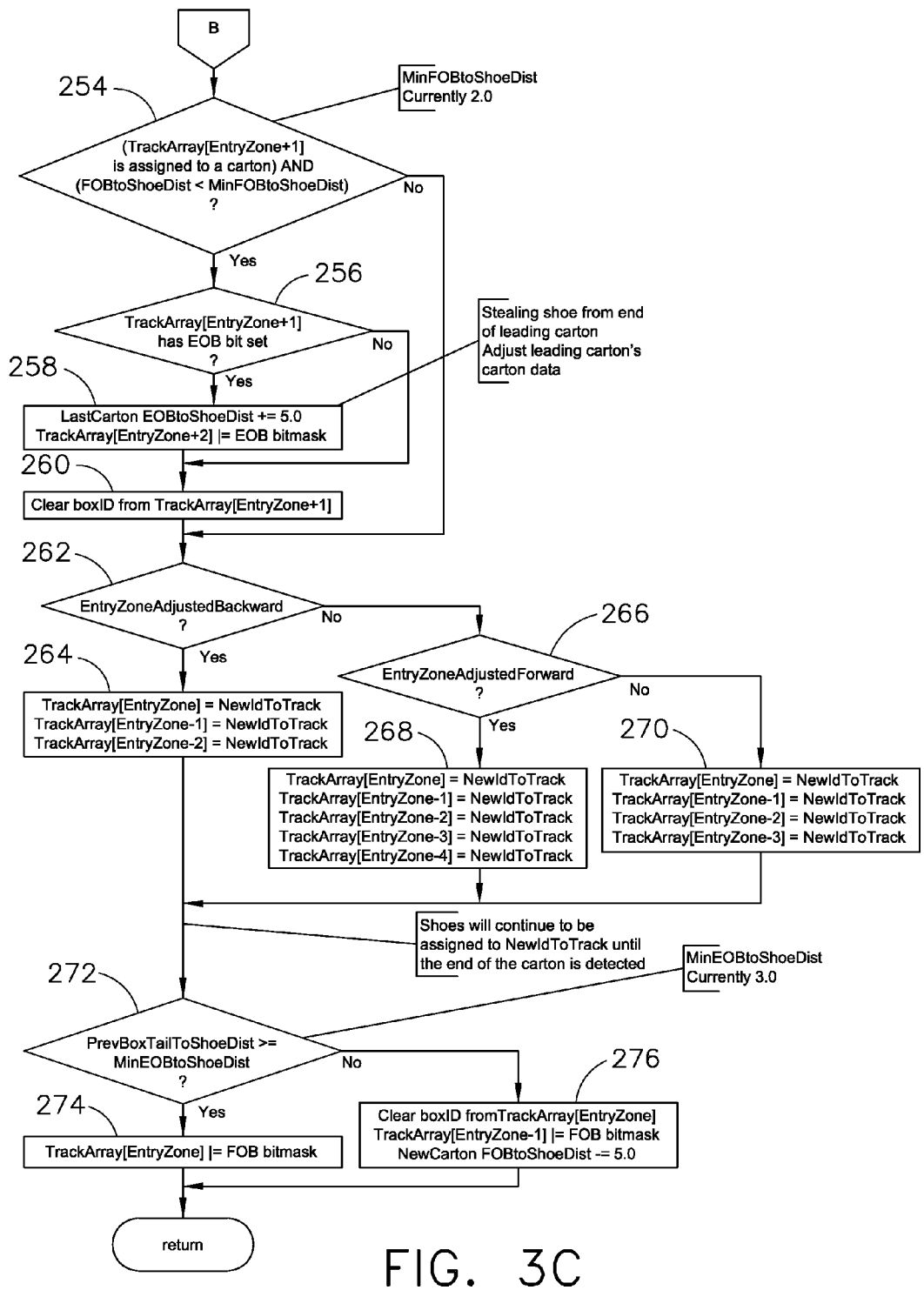

FIGS. 3A, 3B and 3C are a flow diagram illustrating assign shoe to front of box control logic, 200. At 202, the variable named FOBtoShoeDist is set equal to the calibrated value ShoeSensorLEtoShoeDist (which is described below). This step establishes an initial correlation between the front of the box which arrived at the sort induct eye at 100 with the front of the shoe. References to the front of the shoe are to a predetermined location on the shoe, not necessarily the absolute front of the shoe. In the embodiment depicted, the front of the shoe was selected as the leading edge of the divert surface (in this case, the bumper carried by the shoes). Since, in the embodiment depicted, the leading edge of the bearing is not aligned with the front of the shoe, and since the sort induct eye is not necessarily aligned with the bearing of the shoe, the longitudinal distance, which could be characterized as an offset, between the fronts of the boxes and the fronts of the shoes, is calculated. The initial correlation is corrected at steps described below to account for the position of the pusher at the time the front of the box is detected.

At 204, the control logic determines whether the sorter is running at about the target speed. If it is, then at 206 the variable SorterFPM is set equal to the target speed. If it is not, then at 208 SorterFPM is set equal to the calculated speed determined at that time. SorterFPM is used in the next steps to convert time into distance based on the speed of the sorter.

At 210, the variable LeadingGapInches is calculated. The lapsed time, in milliseconds, since the end of the preceding box was detected by the sort induct eye, NewCartonGapAheadInMs, is multiplied by the sorter speed, SorterFPM, and divided by 5000 to arrive at the leading gap for the current carton between the front of the current carton to the end of the preceding carton.

At 212, the ID of the preceding carton, is identified as the current carton's leading carton's ID, NewCartonLeadingID. Thus, the preceding carton's ID is stored in the current carton's record within the Carton Data array. A record is created for each carton detected by the sort induct eye. The speed of the current carton at the time its front reaches the sort induct eye, NewCartonInductedFPM, is set equal to the designated sorter speed, SorterFPM, and stored in the current carton's Carton Data record. The leading gap of the current carton, NewCartonGapAheadInches, is set equal to the LeadingGapInches, and stored in the current carton's Carton Data. The current carton's ID, NewIDToTrack, is the trailing ID, LastCartonTrailingID, of the preceding carton, and is stored in the preceding carton's Carton Data record. The gap between the front of the current carton and the end of the preceding carton, LeadingGapInches, is the trailing gap of the preceding carton, and is stored as such in the preceding carton's Carton Data record.

Steps 214 through 226 represent the control logic that corrects the initial correlation made at 202 between the front of the box and the front of the shoe. At 214, the logic determines whether there is a bearing detected by the first shoe sensor. If not, control passes to 216, and the variable FOBtoShoeDist is set equal to FOBtoShoeDist as initially assigned at 202 plus the sum of the length of time since the first shoe sensor last detected the presence of a shoe bearing, $1^{st}$ ShoeSensor TimeOnLast, plus the time the first shoe sensor has not detected the presence of a shoe bearing since the last time the first shoe sensor detected the trailing edge of the shoe bearing, $1^{st}$ ShoeSensor TimeOff, multiplied by the sorter speed, SorterFPM, divided by 5000.

If at 214, the first shoe sensor indicates the present of the bearing, control is passed to 218, where the control logic tests whether the leading edge of the bearing is at first shoe sensor. If it is, control passes to 220, where the variable FOBtoShoeDist is set equal to the initial FOBtoShoeDist (set at 202) plus 5 inches. This is because the Track Array will be shifted back, to correlate the next segment of the Track Array to the front of the box.

If at 218 the leading edge of the bearing is not at the first shoe sensor, at 222 the control determines whether the bearing is at the first shoe sensor. If so, then at 224 the variable FOBtoShoeDist is set equal to FOBtoShoeDist (as initially assigned at 202) plus the length of time that the first shoe sensor has detected the presence of a shoe bearing since the leading edge of the bearing was detected, $1^{st}$ ShoeSensor TimeOn, multiplied by the sorter speed, SorterFPM, divided by 5000.

If at 222 the control determines the bearing is not at the first shoe sensor, then at 226 the trailing edge of the bearing is determined to be at the first shoe sensor, and the variable FOBtoShoeDist is set equal to FOBtoShoeDist (as initially assigned at 202) plus the length of time that the first shoe sensor last detected the presence of a shoe bearing, $1^{st}$ ShoeSensor TimeOnLast, multiplied by the sorter speed, SorterFPM, divided by 5000.

Next, at 228, whether FOBtoShoeDist is greater than 5 inches (5 inches being the pitch of the pusher) is considered. If it is, the front of the current box aligns with the next shoe, and at 230, and the variable FOBtoShoeDist is decreased 5 inches and the Entry Zone number for the front of the current box is reduced by 1 (correlating the front of the box to the next shoe). Also at 230, EntryZoneAdjustedBackward is set to true (the initialized value on each execution being false).

At 232, whether FOBtoShoeDist is less than zero. If it is, the front of the current box aligns with the preceding Entry Zone, and at 234 the variable FOBtoShoeDist is increased by 5 inches and the Entry Zone number is increased by one. At 234, EntryZoneAdjustedForward is set to true (the initialized value on each execution being false).

At 236, the actual distance between the front of the current box and the front of the shoe that aligns with the front of the current carton when the current carton is on the sorter conveying surface is set equal to the variable FOBtoShoeDist as calculated above, and stored in the current carton's Carton Data record. The distance between the end of the preceding box and the front of the shoe that aligns with the current carton, PrevBoxTailtoShoeDist, is set equal to the gap between the two cartons, LeadingGapInches, minus the actual distance between the front of the current carton and the front of the shoe that aligns with the front of the current carton, FOBtoShoeDist, and stored in the preceding carton's Carton Data record.

At 238, the current carton's leading gap, LeadingGapInches, is tested to determine whether it is less than the minimum leading gap, MinLeadGapRequired (in the embodiment depicted, 1 inch). If it is less, the value NewCartonValidLeadGap for the current carton is set to false at 240. If the current carton's leading gap exceeds the minimum, NewCartonValidLeadGap is set to true at 242. The NewCartonValidLeadGap is then stored in the current carton's Carton Data record.

At 244, the current carton's leading gap, LeadingGapInches, (which is the preceding carton's trailing gap) is tested to determine whether it is less than the minimum trailing gap, MinTrailGapRequired (in the embodiment depicted, 2 inches). If it is less, the value LastCarton ValidTrailGap for the preceding carton is set to false at 246. If the preceding carton's trailing gap exceeds the minimum, LastCarton ValidTrailGap is set to true at 248. The LastCarton ValidTrailGap is then stored in the preceding carton's Carton Data record.

At 250, the logic determines whether the current Entry Zone has an end of box bit set, which would indicate that the current Entry Zone corresponds to a pusher that was assigned to the previous carton. If so, then at 252, that pusher is "stolen" from the preceding carton by increasing the preceding carton's LastCarton EOBtoShoeDist by 5 inches and moving the EOB bitmask for the preceding carton to the segment of the EntryZone plus 1.

At 254, the control logic determines whether the preceding Entry Zone (EntryZone+1) is assigned to a carton, and whether the distance between the front of the current carton to the front of the shoe is less than the minimum allowed distance, MinFOBtoShoeDist (in the embodiment depicted, 2 inches). If it is less, then at 256 the control considers whether the preceding Entry Zone has the end of box bit set. If it does, the control steals the shoe corresponding to the preceding Entry Zone. At 258, the preceding carton's LastCarton EOBtoShoeDist is increased by 5 inches and the EOB bitmask for the preceding carton is moved to the segment of the EntryZone plus 2. At 260, the ID of the preceding carton is cleared from the EntryZone plus 1.

At 262 to 270, the control logic adjusts the data in the Track Array based on whether the Entry Zone was adjusted. At 262, if the entry zone was adjusted backward (see 230), then at 264 the Track Array is moved backward. The Entry Zone described at 264 is as adjusted backward at 230, and that Entry Zone and minus 1 and minus 2 also have the current carton's ID entered there. If adjusted forward (see 234), as determined at 266, the Track Array is moved forward. The Entry Zone described at 268 is as adjusted forward at 234, and that Entry Zone and minus 1, minus 2, minus 3 and minus 4 also have the current carton's ID entered there. If no adjustment was made, the Entry Zone and minus 1, minus 2 and minus 3 also have the current carton's ID entered there.

At 272, the distance between the end of the preceding carton to the front of the shoe, PrevBoxTailToShoeDist, is compared to the minimum end of box distance, MinEOBtoShoeDist (in the embodiment depicted, 3 inches) to consider whether the preceding carton's tail is sufficiently ahead of the front of the pusher that aligns with the current carton to allow that pusher to divert the current carton. If it is greater or equal to, the front of box bit mask for the current carton is set in the EntryZone at 274. If it is not, the current carton ID is cleared from the EntryZone, the front of box bit mask for the current carton is set in the EntryZone minus 1, and the NewCartonFOBtoShoeDist is decreased 5 inches.

Figure 4A:
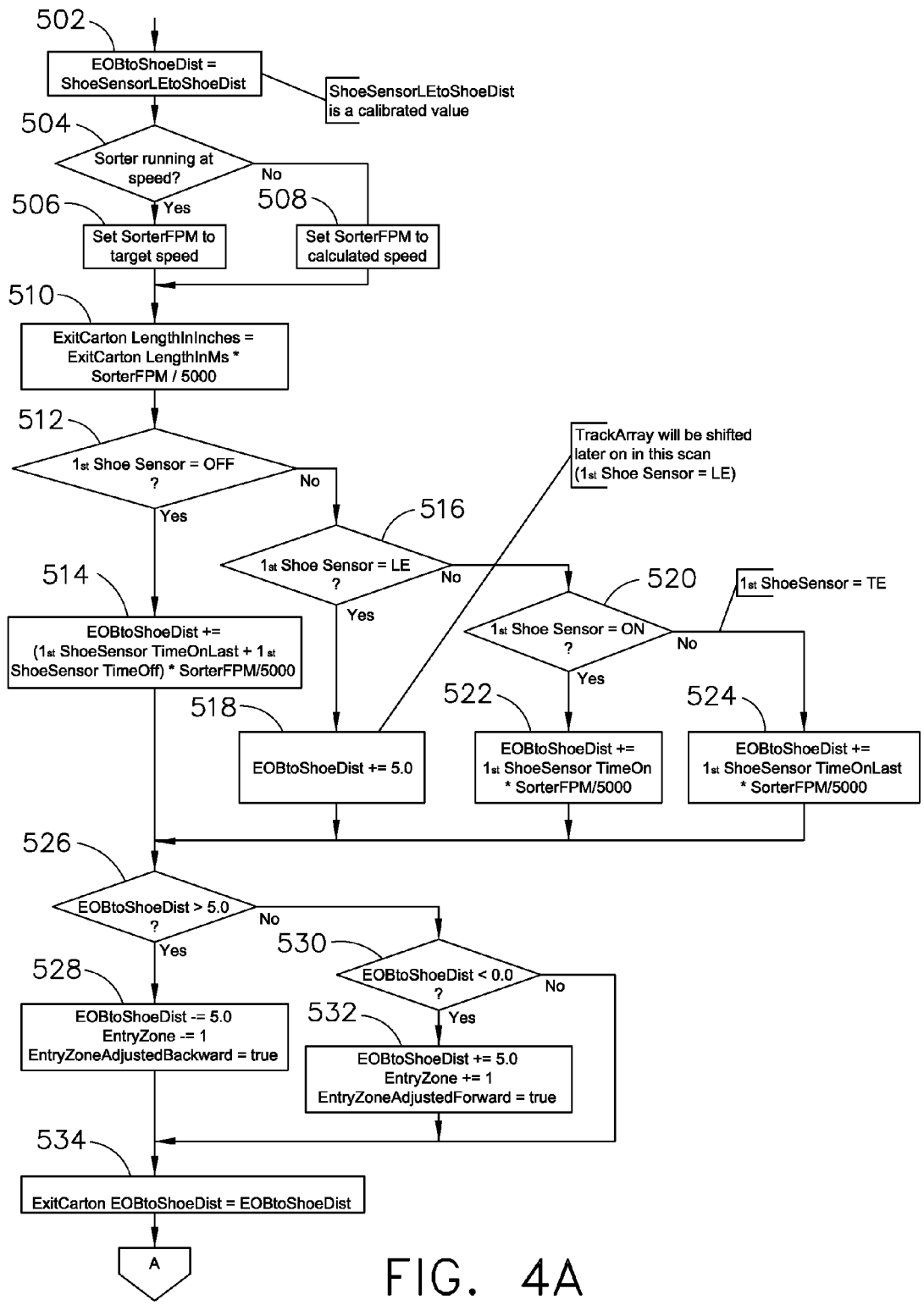
FIGS. 4A and 4B are a flow diagram illustrating assign shoe to end of box control logic used in control of a sortation conveyor system embodying teachings of the present invention.
Figure 4B:
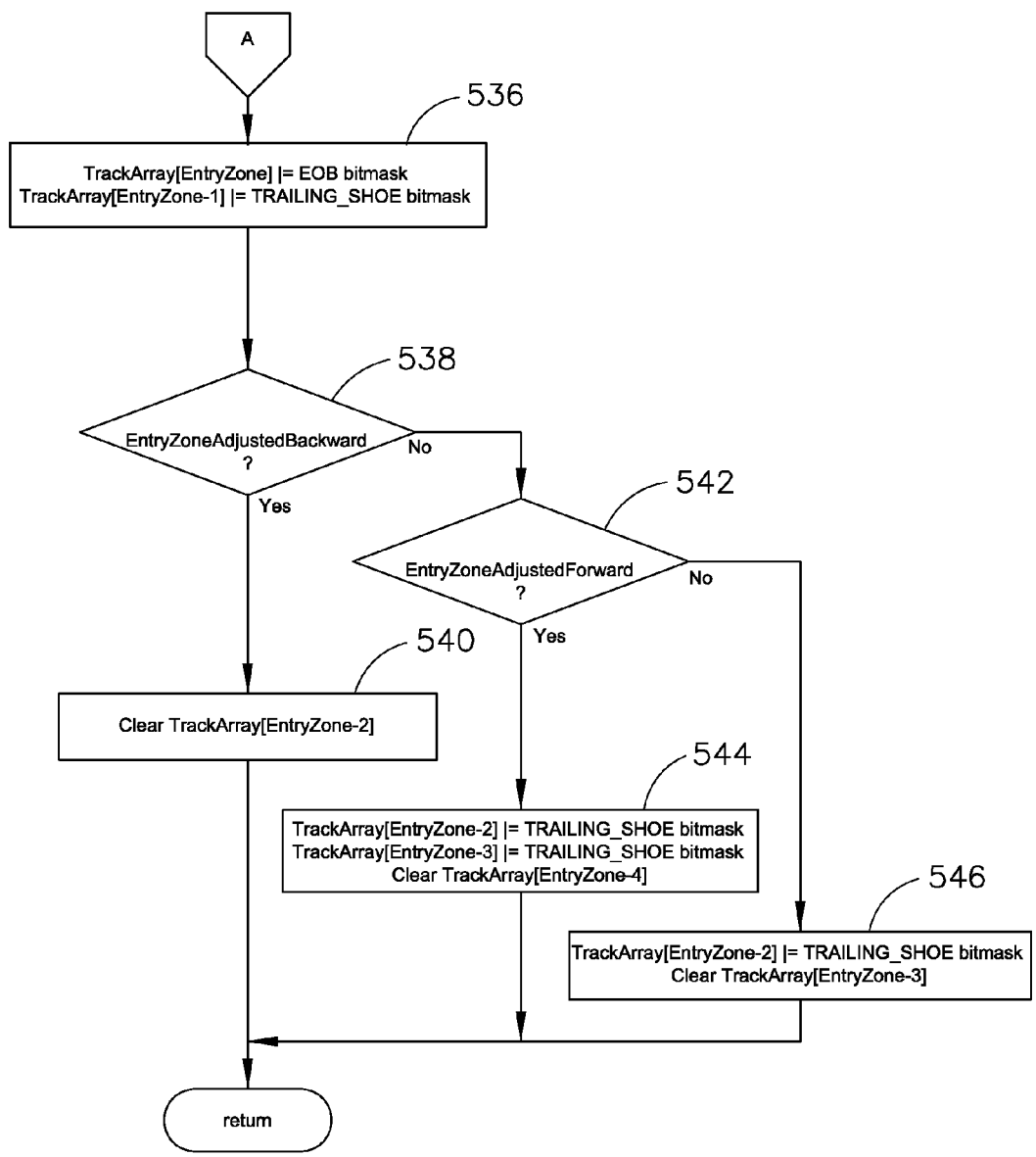

FIGS. 4A and 4B are a flow diagram illustrating assign shoe to end of box control logic, 500. At 502, the variable named EOBtoShoeDist is set equal to the calibrated value ShoeSensorLEtoShoeDist. This step establishes an initial correlation between the end of the box which arrived at the sort induct eye at 400 with the front of the shoe. This initial correlation is corrected at steps described below to account for where the position of the pusher at the time the end of the box is detected.

At 504, the control logic determines whether the sorter is running at about the target speed. If it is, then at 506 the variable SorterFPM is set equal to the target speed. If it is not, then at 508 SorterFPM is set equal to the calculated speed determined at that time. SorterFPM is used in the next steps to convert time into distance based on the speed of the sorter.

At 510, the length of the current carton, ExitCarton LengthInInches, is calculated by multiplying the current carton's length in milliseconds (the time that the sort induct eye detected the current carton) times the sorter speed divided by 5000.

Steps 512 through 524 represent the control logic that corrects the initial correlation made at 502 between the end of the box and the front of the current shoe. At 512, the logic determines whether there is a bearing detected by the first shoe sensor. If not, control passes to 514, and the variable EOBtoShoeDist is set equal to EOBtoShoeDist as initially assigned at 502 plus the sum of the length of time that the first shoe sensor last detected the presence of a shoe bearing, $1^{st}$ ShoeSensor TimeOnLast, plus the time the first shoe sensor has not detected the presence of a shoe bearing since the last time the first shoe sensor detected the trailing edge of the shoe bearing, $1^{st}$ ShoeSensor TimeOff, multiplied by the sorter speed, SorterFPM, divided by 5000.

If at 512, the first shoe sensor indicates the present of the bearing, control is passed to 516, where the control logic tests whether the leading edge of the bearing is at first shoe sensor. If it is, control passes to 518, where the variable EOBtoShoeDist is set equal to the initial EOBtoShoeDist (set at 502) plus 5 inches. This is because the Track Array will be shifted back, to correlate the next segment of the Track Array to the end of the box.

If at 516 the leading edge of the bearing is not at the first shoe sensor, at 520 the control determines whether the bearing is at the first shoe sensor. If so, then at 522 the variable EOBtoShoeDist is set equal to EOBtoShoeDist (as initially assigned at 502) plus the length of time that the first shoe sensor has detected the presence of a shoe bearing since the leading edge of the bearing was detected, $1^{st}$ ShoeSensor TimeOn, multiplied by the sorter speed, SorterFPM, divided by 5000.

If at 520 the control determines the bearing is not at the first shoe sensor, then at 524 the trailing edge of the bearing is determined to be at the first shoe sensor, and the variable EOBtoShoeDist is set equal to EOBtoShoeDist (as initially assigned at 502) plus the length of time that the first shoe sensor last detected the presence of a shoe bearing, $1^{st}$ ShoeSensor TimeOnLast, multiplied by the sorter speed, SorterFPM, divided by 5000.

Next, at 526, whether EOBtoShoeDist is greater than 5 inches is considered. If it is, the end of the current box aligns with the next shoe, and at 528, and the variable EOBtoShoeDist is decreased 5 inches and the Entry Zone number for the end of the current box is reduced by 1 (correlating the end of the box to the next shoe). Also at 528, EntryZoneAdjusted-Backward is set to true (the initialized value on each execution being false).

At 530, whether EOBtoShoeDist is less than zero. If it is, the end of the current box aligns with the preceding Entry Zone, and at 532 the variable EOBtoShoeDist is increased by 5 inches and the Entry Zone number is increased by one. At 532, EntryZoneAdjustedForward is set to true (the initialized value on each execution being false). At 534, ExitCarton EOBtoshoeDist is set equal to EOBtoShoeDist.

Next at 536, the end of box bit mask for the current carton is set in the Entry Zone (as may have been reset at 528 or 532).

At 538 to 546, the control logic adjusts the data in the Track Array based on whether the Entry Zone was adjusted. At 538, if the entry zone was adjusted backward (see 528), then at 540 the Entry Zone minus 2 is cleared. If adjusted forward (see 532), the Track Array is moved forward. The Entry Zone minus 2 and minus 3 are set with the trailing shoe bitmask for the current carton, and the Entry Zone minus 4 is cleared. If no adjustment was made, at 546, the Entry Zone minus 2 is set with the trailing shoe bitmask for the current carton, and the Entry Zone minus 3 is cleared.

Figure 5A:
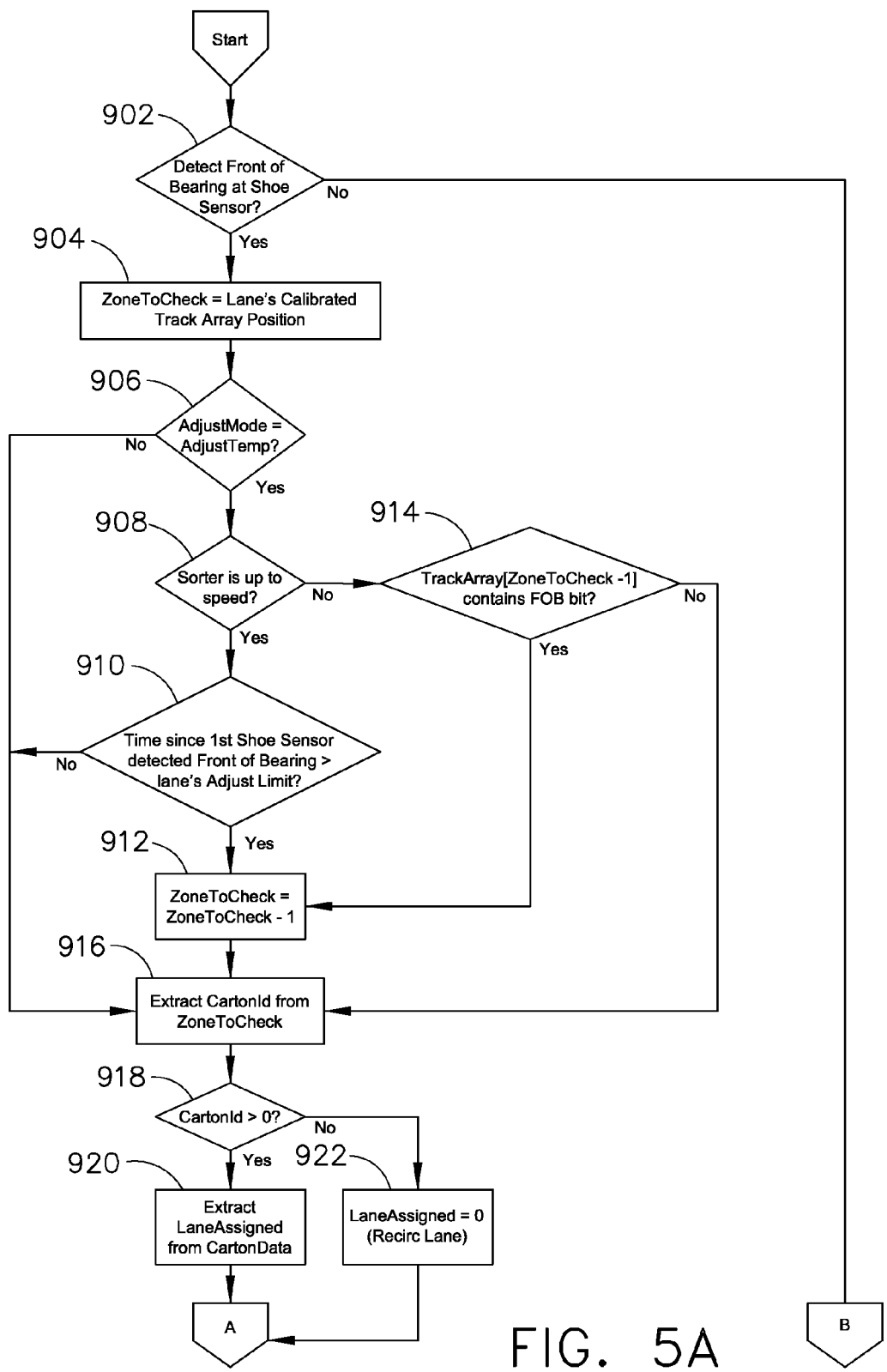
FIGS. 5A and 5B are a flow diagram illustrating divert control logic used in the control of a sortation conveyor system embodying teachings of the present invention.
Figure 5B:
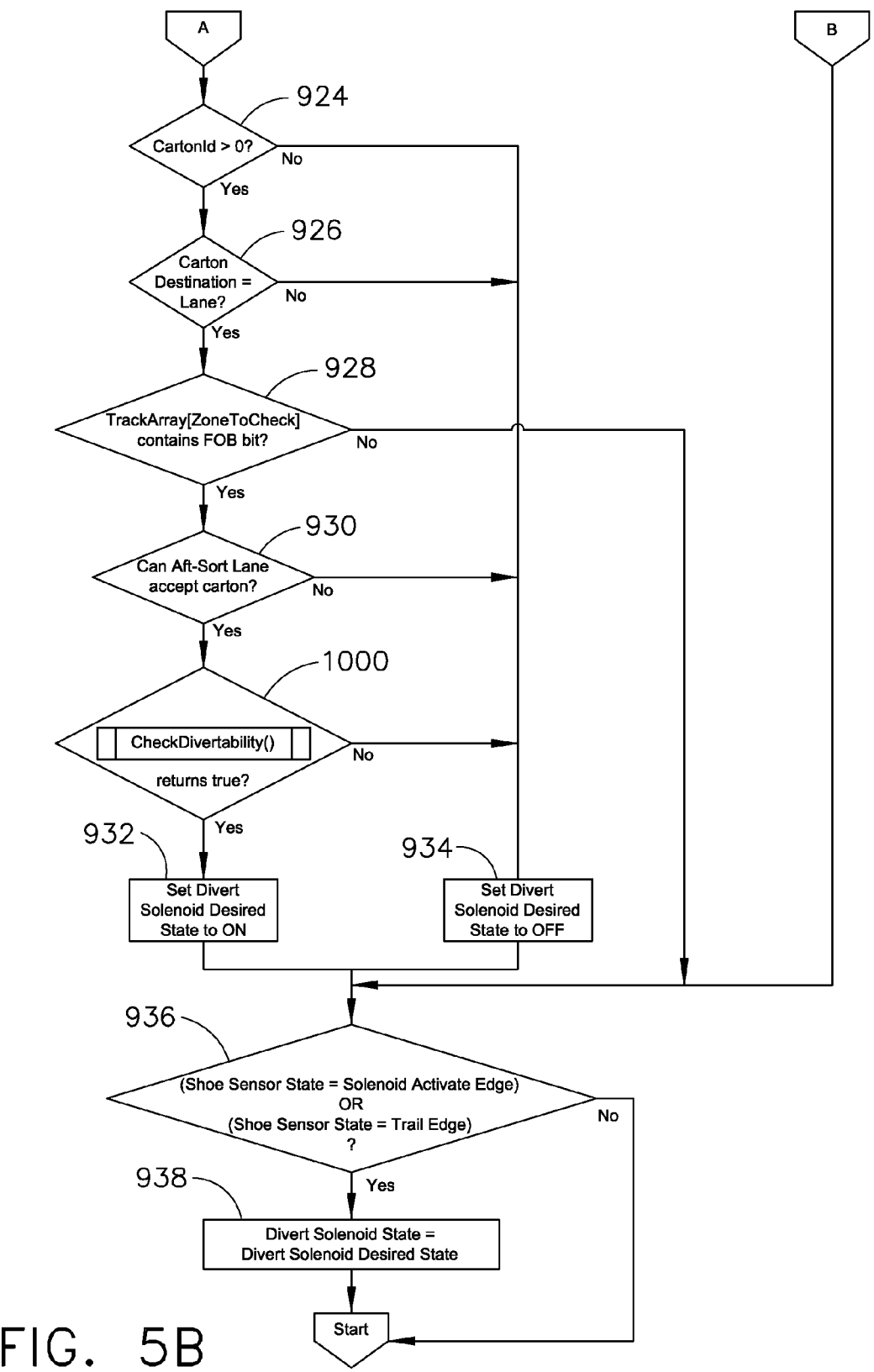

FIGS. 5A and 5B are a flow diagram illustrating divert control logic. The divert control logic determines whether to divert a carton at a divert. The logic may be executed at any suitable rate, such as every 2 milliseconds. At 902, the control determines whether the leading edge of the bearing is detected at the divert location (or lane) under consideration. If not, the control passes to 936. If the a bearing's leading edge is detected, then at 904 the variable ZoneToCheck is set to that lane's calibrated Track Array's position. Since the divert logic is executed for each lane, this defines the lane under consideration for any particular execution of the logic.

906 to 916 illustrates an adjustment routine as is known in the art to consider the relation between the arrival of the leading of a bearing at the shoe sensor of the lane under consideration to the proximal in time arrival of the leading of a bearing at the first lane shoe sensor (the reference location), and adjust the zone to check in the Track Array.

At 918, the control logic determines whether there is a carton ID in the Track Array zone being checked. If there is, then at 920 the control reads the assigned lane for that carton ID from the Carton Data. If not, then at 922, the lane assigned for that shoe is set to zero, and the shoe will not be diverted.

If at 924, there is a carton ID in the Track Array zone being checked, then at 926 the control determines whether the carton is to be diverted at that lane. If it is, then at 928, the zone being checked is checked for a front of box bit. If a front of box bit is present, then at 930, the control determines whether the divert conveyor can accept the carton. If it can, then check divertability control logic 1000 is called. If check divertability control logic 1000 returns "true", then at 932, the desired solenoid (of the switch) state is set to on. If any of 924, 926 or 930 is no, or if check divertability control logic 1000 returns false, then at 934 the desired solenoid state is set to off.

At 936, the control logic determines whether the divert solenoid switches when the leading edge or the trailing edge of the bearing is detected. This may vary depending on the sorter speed. At 938, the divert solenoid state is set to the desired state.

Figure 6A:
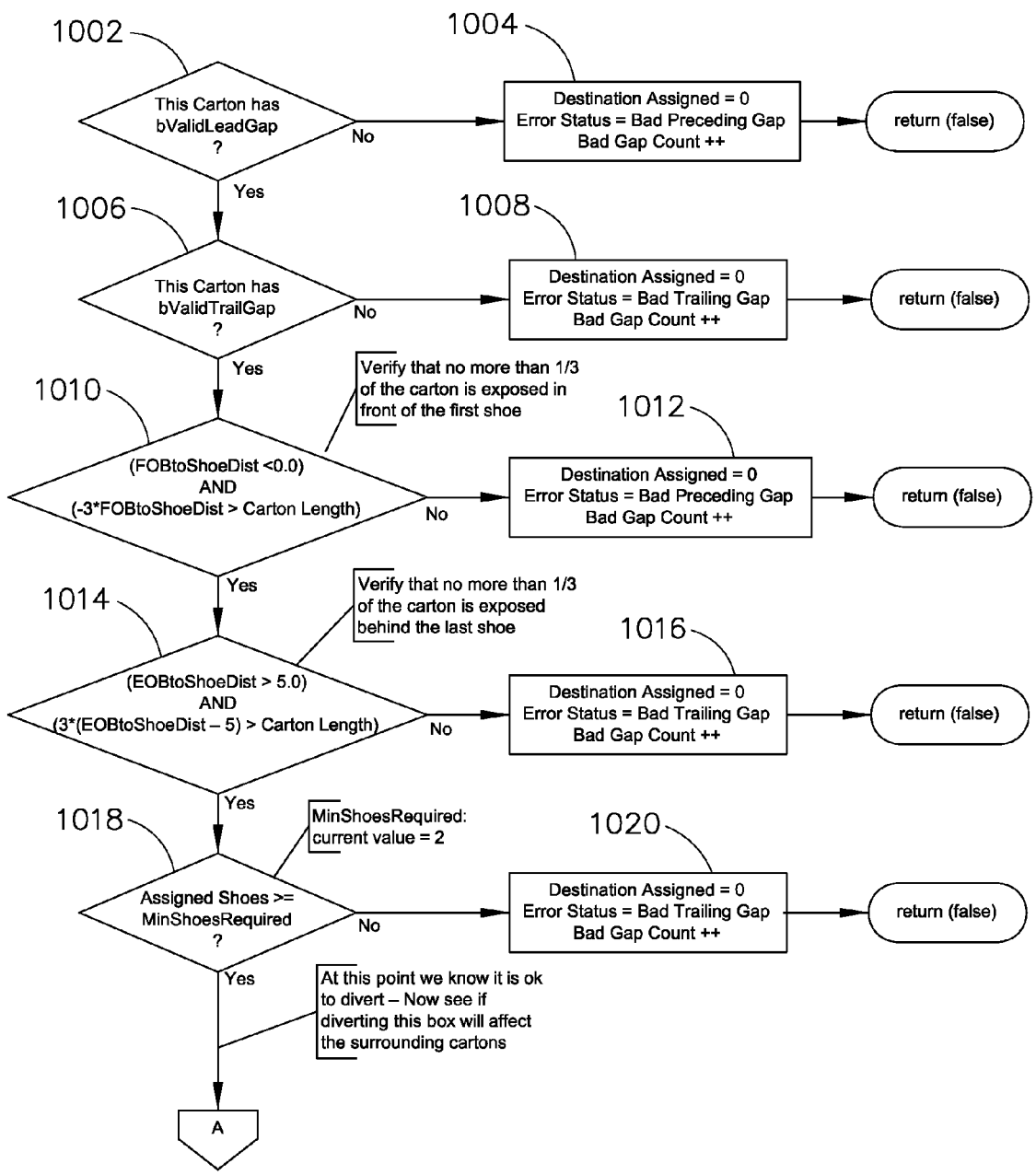
FIGS. 6A and 6B are a flow diagram illustrating check divertability control logic used in control of a sortation conveyor system embodying teachings of the present invention.
Figure 6B:
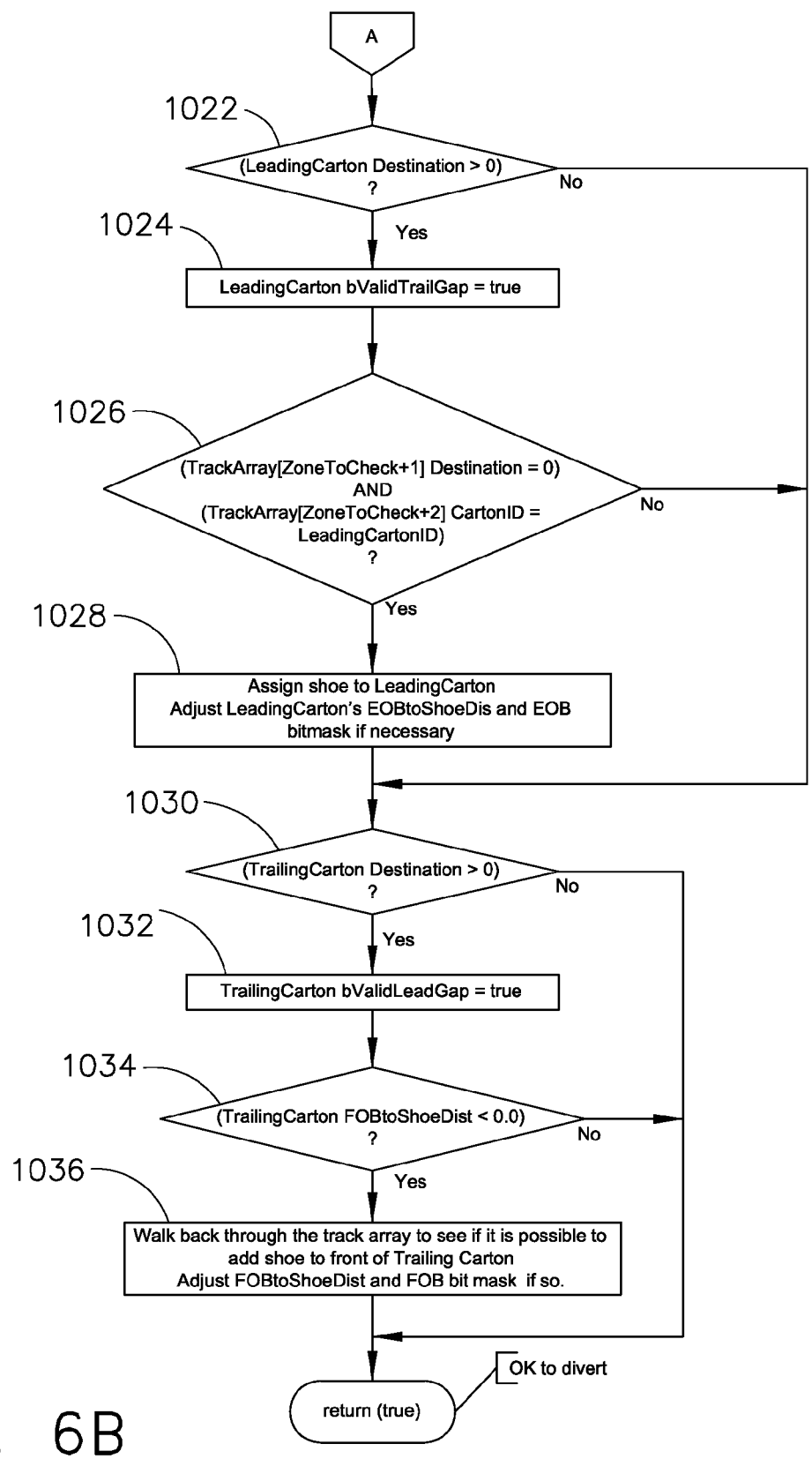

FIGS. 6A and 6B are a flow diagram illustrating check divertability control logic 1000. At 1002, the control determines whether leading gap of the carton is valid. If it is not, then at 1004 the destination in that carton's Carton Data record is set to zero, and it will not be diverted, instead going to the recirc conveyor. At 1004, data is set concerning the non-divert of the carton, in this case due to an invalid leading gap, and the bad gap count is incremented.

At 1006, the control routine determines whether the trailing gap of the carton is valid. If it is not, then at 1008 the destination in that carton's Carton Data record is set to zero, and it will not be diverted, instead going to the recirc conveyor. At 1008, data is set concerning the non-divert of the carton, in this case due to an invalid trailing gap, and the bad gap count is incremented.

At 1010, the control considers whether the front of the carton extends beyond the front of the shoe, FOBtoShoeDist<0.0, and if so, considers whether the carton overhangs the shoe by more than ⅓ of the carton's length, −3*FOBtoShoeDist>Carton Length. Minus 3 accounts for the FOBtoShoeDist being negative. If more than ⅓ of the carton extends beyond the front of the first shoe, then at 1012, the destination in that carton's Carton Data record is set to zero, and it will not be diverted, instead going to the recirc conveyor. At 1012, data is set concerning the non-divert of the carton.

At 1014, the control considers whether the end of the carton extends rearward beyond the front of the last shoe by considering whether EOBtoShoeDist>5.0 inches, and if so, considers whether the carton overhangs past the shoe by more than ⅓ of the carton's length, 3*(EOBtoShoeDist−5)>Carton Length. If more than ⅓ of the carton extends beyond the end of the last shoe, then at 1016, the destination in that carton's Carton Data record is set to zero, and it will not be diverted, instead going to the recirc conveyor. At 1016, data is set concerning the non-divert of the carton.

At 1018, the control considers whether the number of shoes assigned to divert the carton is equal to or exceeds the minimum number of shoes required (in the embodiment depicted, 2 shoes). If not, then at 1020, the destination in that carton's Carton Data record is set to zero, and it will not be diverted, instead going to the recirc conveyor. At 1020, data is set concerning the non-divert of the carton.

If the answers to 1002, 1006, 1010, 1014 and 1018 are yes, then the carton is OK to divert, and the control logic considers the affect of diverting this carton on the adjacent cartons.

At 1022, the control logic considers whether the leading carton has been assigned a lane, and is therefore going to be diverted. If it is, then at 1024 the control sets the valid trail gap for the leading carton to true.

At 1026, the zone to check plus 1 is examined to determine whether the shoe associated with that zone is not to be diverted, destination=0, and checks whether the zone to check plus 2 has a carton ID (whether the associated shoe is assigned to a carton). If the answers are yes, then at 1028 the shoe is assigned to the leading carton and the leading carton's EOBtoShoeDist and end of box bit mask is adjusted if necessary.

At 1030, the logic considers whether the trailing carton has been assigned a lane, and therefore is going to be diverted. If it is, then at 1032, the control sets the valid lead gap for the tailing carton to true. Then, at 1034, the trailing carton is examined to see whether its front extends past the front of shoe. If so, then at 1036 the control logic checks backwards through the Track Array for whether the first shoe not diverting can be assigned to the front of the trailing carton. After that, the current carton is OK to divert, and the check divertability control logic 1000 returns true.

Figure 7A:
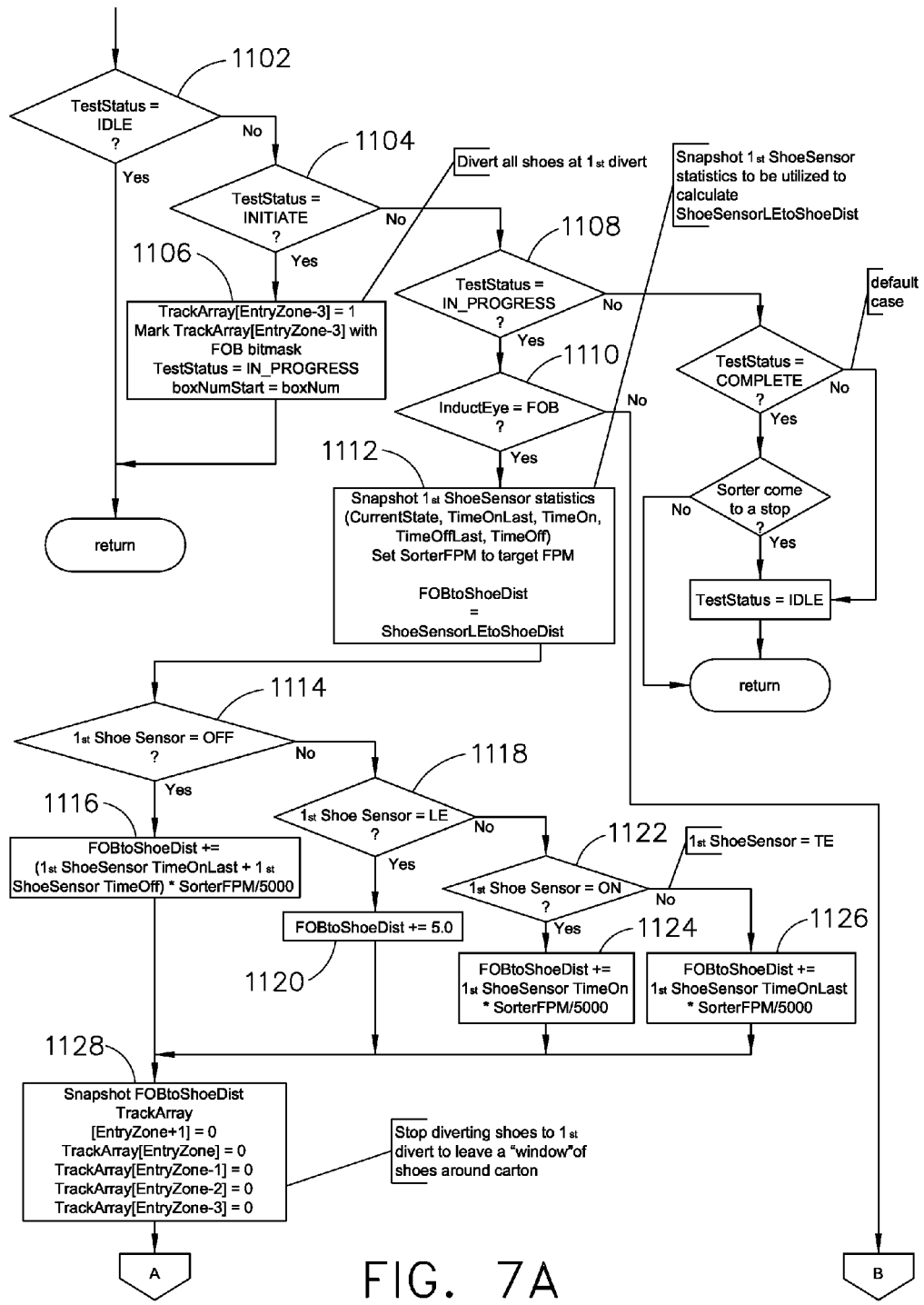
FIGS. 7A and 7B are a flow diagram illustrating calibration logic used in the control of a sortation conveyor system embodying teachings of the present invention.
Figure 7B:
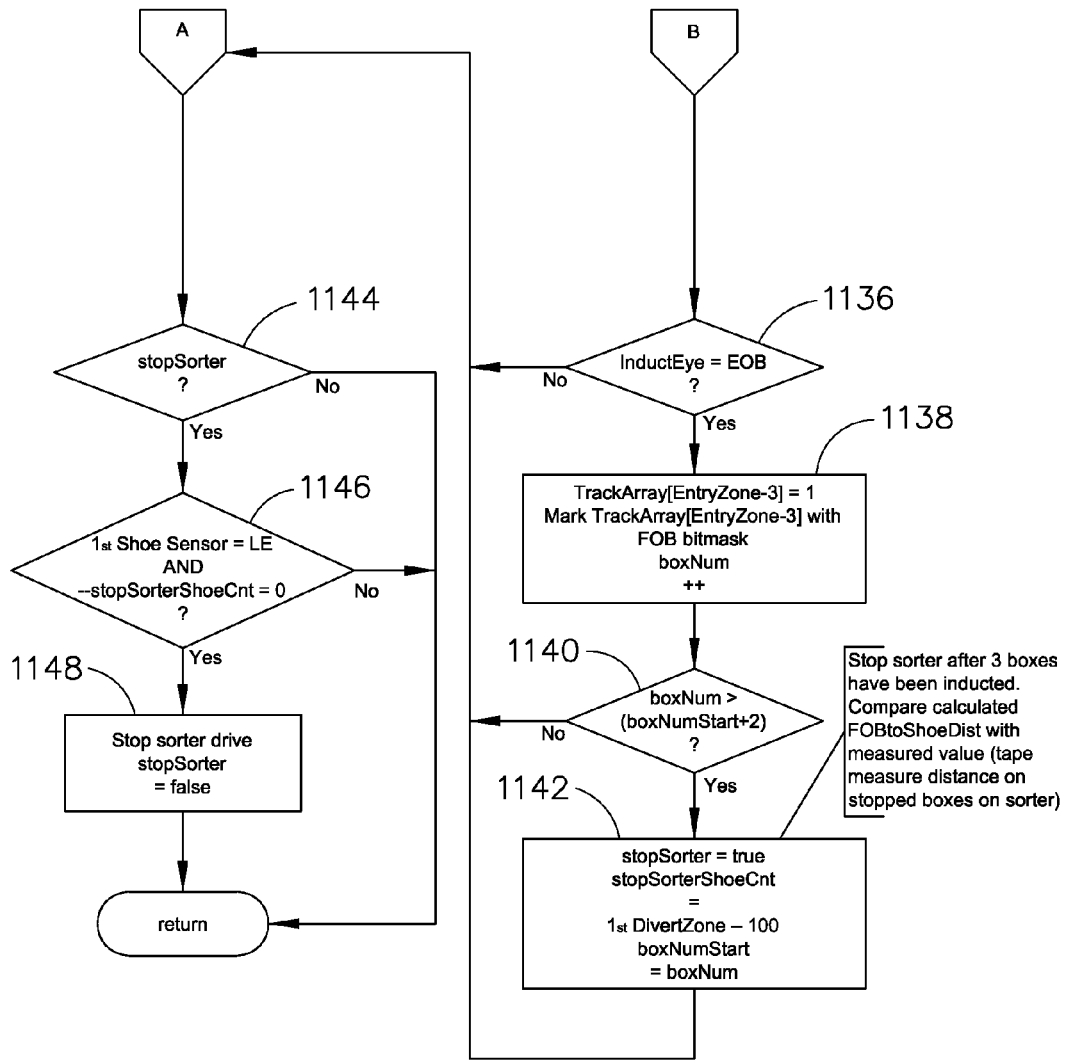
Figure 8:
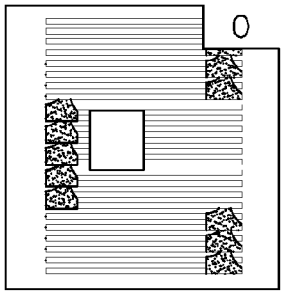
FIG. 8 illustrates an embodiment of a user interface screen used with control logic.

FIGS. 7A and 7B are a flow diagram illustrating calibration logic. The calibration logic is used to provide correlation between the sort induct eye and the first shoe sensor. The calibration logic is initiated by an operator, such as through the interface illustrated in FIG. 8. In operation, in the embodiment depicted, operates on three cartons at a time to provide empirical correlation to the calculated relationship between the sort induct eye and the first shoe sensor. It will divert all shoes except those aligned with each the three cartons, thereby creating a window around the test cartons and making it obvious which shoes have been assigned, and then stop operation, at which time the distance between the front of each box to the front of each box's first aligned shoe, so the operator can compare the two values. If the differences are small enough, for example within ½ inch to ¾ inch, then additional correction may not be warranted. If the differences are not small, the measured distances can be entered, such as in the appropriate fields shown in FIG. 8, and the control will recalculate the calibration value. The calibration can be rerun as the operator desires until the measured distances are sufficiently close to the calculated distances. The calibration value is used by the control logic as described herein.

At 1102, the control considers whether the test status is idle. If it is not, control is passed to 1104, where the test status is checked for being at the initiate stage. If so, the entry zone minus 3 is set to divert at lane 1, and marked with a front of box bitmask. The status is set to in progress, and the box number is set.

If at 1104, the status is set in progress, control passes to 1108, and status is checked whether it is in progress. If so, then at 1110, the control determines whether the sort induct eye detects a front of box. If not, control passes to 1136 where the control considers whether the sort induct eye detects an end of box. If a front of box is detected at 1110, control passes to 1112 where statistics for calculating the shoe sensor leading edge to the front of shoe distance are captured. The sorter speed is set to the target sorter speed, and the variable FOBtoShoeDist is set equal to the ShoeSensorLEtoShoeDist, which is manually set for the start of the system, based on user input, such as physical measurements and previous results with similar systems.

Next from 1114 to 1126, the relation between the front of the box to the front of the shoe is determined, in the manner as described above for the front of box assign and end of box assign control logics. At 1128, a snapshot of the FOBtoShoeDist value is captured, and the lane assignments for the Entry Zone plus 1, zero, minus 1, minus 2, and minus 3 are set to zero, so that the aligned pushers are not diverted.

Referring to step 1136, if the sort induce eye detects the end of a box, at 1138 the Entry Zone minus 3 is set to 1, and the front of box bit mask is set to zero. At 1138, the box number is incremented, then at 1140 the box number is checked to see if three boxes have been processed. At 1142, the stop sorter flag is set to true, and the box number for the start of the next calibration run is set to the current box number.

At 1144, the stop sorter flag is checked. If it is true, then at 1146, the logic considers whether the first shoe sensor detects the leading edge of a bearing and if the stop sorter shoe counter is at zero, which was set equal to the first divert zone minus 100 at 1142. If so, it stops the sorter.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted herewith.

The invention claimed is:

1. A method of calibrating the control system of a sortation conveyor, the control system having control logic for the operation of the sortation conveyor, the sortation conveyor having a plurality of shoes and a conveying surface, a sort induct sensor and a first shoe sensor, the control logic including a representation of spacial correlation between the sort induct sensor and the first shoe sensor, the method comprising the step of:
   a. placing the control system in calibration mode wherein calibration logic is executed;
   b. introducing a plurality of articles on the conveying surface upstream of the sort induct sensor and the first shoe sensor, each article of said plurality of articles having a respective leading edge;
   c. advancing the conveying surface so that the respective leading edge of each article is detected by said induct sensor;
   d. assigning one or more respective pushers to each article, having a respective first pusher;
   e. determining the respective distances between the respective leading edges of each article and that article's first pusher; and
   f. calculating a calibration value based on the respective distances which is indicative of spacial correlation between the sort induct sensor and the first shoe sensor.

2. The method of claim 1, comprising the step of stopping the conveyor prior to determining the distance between the respective leading edge of each article and that article's first pusher.

3. The method of claim 2, wherein the step of determining the respective distances comprises the step of physically measuring the respective distances.

4. The method of claim 1, wherein the step of determining the respective distances comprises the step of physically measuring the respective distances.

5. The method of claim 1, wherein the step of assigning one or more respective pushers comprises the steps of diverting only pushers which are not assigned.

6. The method of claim 1, comprising the step of adjusting the representation of spacial correlation of the control logic based upon the calibration value.

7. The method of claim 6, comprising the steps of generating for each article a respective calculated distance between the respective leading edges of each article and that article's first pusher.

8. A method of calibrating the control system of a sortation conveyor, the control system having control logic for the operation of the sortation conveyor, the sortation conveyor having a plurality of shoes and a conveying surface, a sort induct sensor and a first shoe sensor, the control logic including a representation of spacial correlation between the sort induct sensor and the first shoe sensor, the method comprising the step of:
   a. placing the control system in calibration mode wherein calibration logic is executed;
   b. introducing a plurality of articles on the conveying surface upstream of the sort induct sensor and the first shoe sensor, each article of said plurality of articles having a respective leading edge;
   c. advancing the conveying surface so that the respective leading edge of each article is detected by said induct sensor;

d. assigning one or more respective pushers to each article, having a respective first pusher;
e. generating for each article a respective calculated distance between the respective leading edges of each article and that article's first pusher;
f. determining for each article respective actual distances between the respective leading edges and that article's first pusher;
g. calculating a calibration value based on the respective distances which is indicative of spacial correlation between the sort induct sensor and the first shoe sensor;
h. adjusting the representation of spacial correlation of the control logic based upon the calibration value; and
i. repeating steps b through f.

* * * * *